United States Patent
Hafer

[15] 3,636,237

[45] Jan. 18, 1972

[54] BUS DUCT

[72] Inventor: Paul M. Hafer, Florence, Ky.

[73] Assignee: Arrow-Hart, Inc., Hartford, Conn.

[22] Filed: Sept. 8, 1970

[21] Appl. No.: 70,010

Related U.S. Application Data

[63] Continuation-in-part of Ser. No. 832,405, June 11, 1969, abandoned.

[52] U.S. Cl. ..........................174/68 B, 174/88 B, 174/99 B
[51] Int. Cl. ..................................H01b 7/08, H02g 15/08
[58] Field of Search ......................174/68 B, 88 B, 99 B, 16 B

[56] References Cited

UNITED STATES PATENTS

| | | | |
|---|---|---|---|
| 2,216,870 | 10/1940 | Adam | 174/99 B |
| 3,444,311 | 5/1969 | Weimer et al. | 174/68 B |

*Primary Examiner*—Darrell L. Clay
*Attorney*—Wood, Herron & Evans

[57] ABSTRACT

A bus duct comprised of a group of elongated, flat bus bars positioned in side-by-side relation within an elongated housing, the housing having sidewalls of a height substantially greater than the width of the bus bars. In preferred form, the bus duct of this invention includes bus bars separated one from the other and from the sides of the housing only by insulator sheets positioned therebetween to form a sidewall-insulator sheet-bus bar "sandwich." Further, the sidewall-insulator sheet-bus bar "sandwich" is maintained in functional assembly by (a) at least two clips spanning the sidewalls at separate positions longitudinally spaced one from the other along the top edges of the sidewalls, the spanning portion of each of the clips being substantially spaced above the bus bar group, and (b) at least two clips spanning the sidewalls at separate positions longitudinally spaced from one another along the bottom edges of the sidewalls, the spanning portion of each of the clips being substantially spaced below the bus bar group. Thus, the clips serve to restrain mechanically the bus bar group, insulator sheets, and the housing's sidewalls in compact, assembled, side-by-side relation.

24 Claims, 16 Drawing Figures

INVENTOR
Paul M. Hafer
BY
Wood, Herron and Evans
ATTORNEYS

INVENTOR
Paul M. Hafer
BY
Wood, Herron & Evans
ATTORNEYS

INVENTOR
Paul M. Hafer
BY
Wood, Herron and Evans
ATTORNEYS

INVENTOR.
Paul M. Hofer
BY
Wood, Herron and Evans
ATTORNEYS

BUS DUCT

This application is a continuation-in-part of U.S. application Ser. No. 832,405, filed June 11, 1969, now abandoned, by the inventor named herein and assigned to the assignee of this application.

This invention relates to bus ducts and, more particularly, relates to a novel bus duct construction.

Electric power distribution systems in industrial and commercial buildings utilize bus bars to transfer electric power from a substation or transformer bank to a power consuming area. Such power distribution systems are generally made up of a plurality of bus ducts of fixed or variable lengths, successive ducts being connected or interlocked one to the other in end-to-end relation by a suitable bus bar coupler system to provide electrical continuity between the power source and the power consuming area.

A bus duct is generally comprised of a group of elongated bus bars supported in insulated relation relative one to the other within an elongated housing. One type of bus duct structure that has recently been marketed is that type having a plurality of elongated, flat bus bars positioned in side-by-side relation within a housing, the housing having a pair of elongated sidewalls of a height substantially greater than the width of the bus bars. The bus bars and housing sidewalls are separated one from the other only by insulation means of the type generally having a thickness less than the thickness of a single bus bar. Bus ducts of this general design have been found particularly desirable for use at relatively low voltage values, for example, 600 volts and below, as well as at relatively high amperage values for example, 1,000 amperes and over. Such a bus duct structure has been found particularly useful in certain applications because both reactance and impedance are decreased for a given length of bus duct. That is, for a given length of this type bus duct the voltage drop has been found to be less than in that type of bus duct where the bus bars may be separated in their side-by-side relation by, for example, air spaces. Further, this type bus duct structure has been found to be more efficient in dissipating heat created within the bus bars when loaded to maximum or approximately maximum amperage capacity. Additionally, the size and weight of a bus duct having this type of structure is minimized, thereby making final installation of the ducts easier for the contractor.

One bus duct construction of the type broadly described above involves the bonding and banding together of a plurality of bus bars into a preformed assembly. The bus bar assembly is thereafter provided with a housing where the sidewalls of the bus bar assembly are bonded to the housing's sidewalls along the entire length of the housing. This ensures that the bus bar assembly maintains its final assembled position inside the housing particularly when extreme temperature and/or force, for example, due to short circuits, is exerted on the bus duct. Such a bus duct structure is more explicitly described in U.S. Pat. No. 3,187,086.

Another bus duct construction of the type broadly described above involves the tying together of the opposite sidewalls of the housing by flat, elongated tie plates stretching the entire length of the bus bar housing. The tie plates are welded to the sidewalls. One tie plate is positioned immediately on top of and in contact with the bus bar assembly inside the housing, and the other tie plate is positioned immediately on the bottom of and in contact with the bus bar assembly inside the housing. As mentioned, these flat, elongated tie plates are welded to the sidewalls of the bus duct to ensure that the bus bar assembly maintains its assembled position inside the housing particularly when the duct is exposed to short circuit forces. Such a bus duct structure is more explicitly described in U.S. Pat. No. 3,384,702.

In designing bus ducts it will be appreciated that a desirable objective is to provide a structure that is as simple and easy to assemble as is possible to provide economical manufacturing costs. To achieve such an objective it will be appreciated that the parts of the bus duct must be simple in structure so that assembly of those parts into the final bus duct product can be achieved without high labor costs or high capital investments in equipment needed for assembly. However, bus ducts of the type briefly described above and disclosed in the above U.S. patents provide material cost and assembly problems not inherent in the bus duct of this invention. It will be apparent to those skilled in the art that the bus duct constructions known to the prior art are relatively complex to assemble and, indeed, require either special insulating-bonding materials in their assembly as is the case in U.S. Pat. No. 3,187,086 or complex welding equipment as in the case of U.S. Pat. No. 3,384,702.

It has been a basic objective of this invention to provide a bus duct structure of that general type described above which is comprised of simple parts and which is easy to assemble during manufacture.

It has been a another objective of this invention to provide a bus duct structure which, during assembly, does not necessarily require insulative wrapping of the bus bars, does not require special assembling of the bus bars into a preformed assembly, does not require special bonding agents for adhering the housing's sidewalls to the bus bar assembly, and does not require welding equipment for achieving the final housing configuration.

These objectives have been attained for that type of bus duct comprised of a group of elongated, flat bus bars positioned in side-by-side relation within an elongated housing having sidewalls of a height substantially greater than the width of the bus bars. In preferred form the bus duct of this invention includes bus bars separated one from the other and from the sides of the housing only by insulator sheets positioned therebetween to form a sidewall-insulator sheet bus bar "sandwich." Further, the sidewall-insulator sheet bus bar "-sandwich" is maintained in functional assembly by (a) at least two clips spanning the sidewalls at separate positions longitudinally spaced one from the other along the top edges of the sidewalls, the spanning portion of each of the clips being substantially spaced above the bus bar group, and (b) at least two clips spanning the sidewalls at separate positions longitudinally spaced from one another along the bottom edges of the sidewalls, the spanning portion of each of the clips being substantially spaced below the bus bar group. Thus, the clips serve to restrain mechanically the bus bar group, insulator sheets, and the housing's sidewalls in compact, assembled, side-by-side relation.

Other objectives and advantages will be more apparent from the following detailed description taken in conjunction with the drawings in which.

Figures 1, 2:
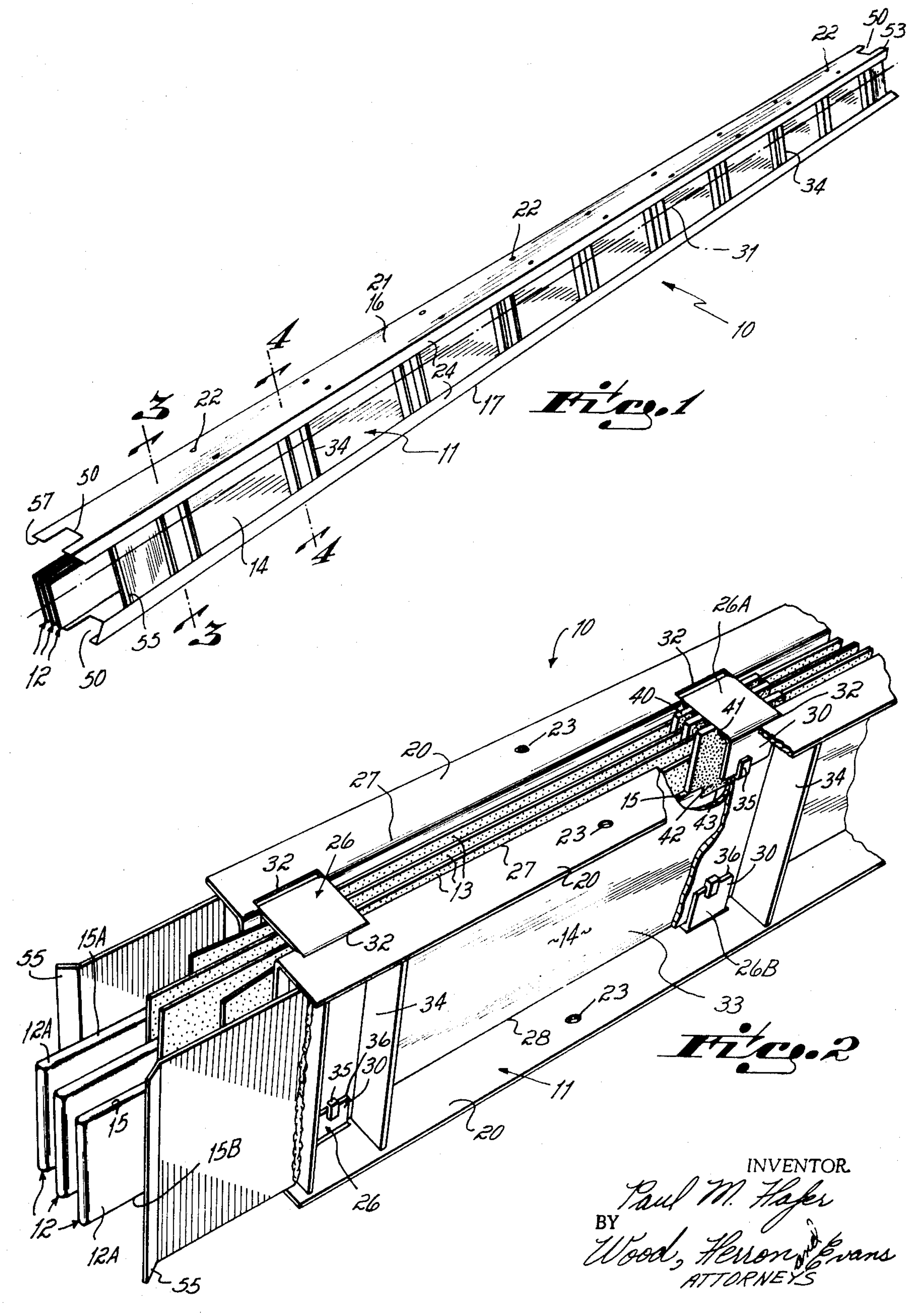
FIG. 1 is perspective view of a first bus duct embodiment formed in accordance with the principles of this invention.
FIG. 2 is a partially broken away, blown up perspective view of one end of the bus duct illustrated in FIG. 1 with the housing's top and bottom removed.
Figure 7:
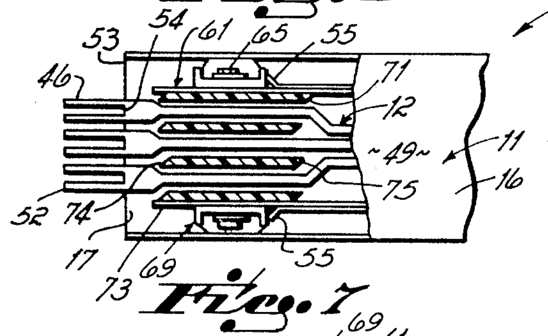
FIG. 7 is a partially broken away, diagrammatic top view of the bus bar coupler partially recessed or telescoped into the bus duct.
Figure 8:
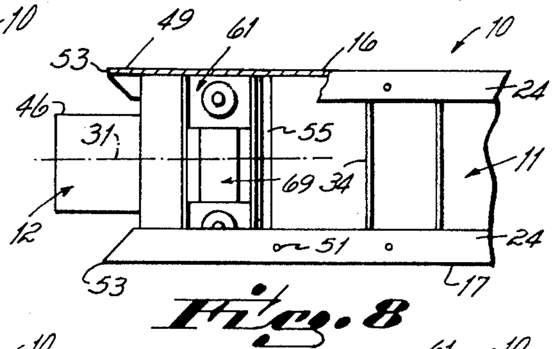
FIG. 8 is a side view showing the bus bar coupler position as illustrated in FIG. 7.
Figure 9:
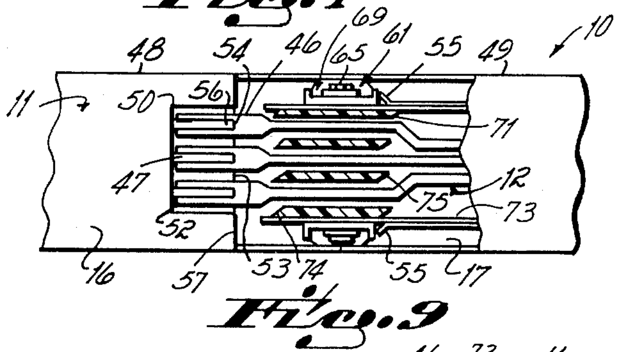
Figure 10:
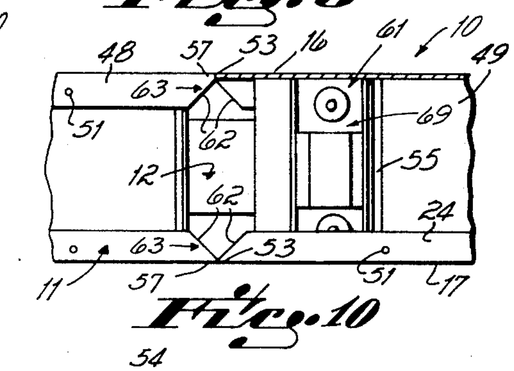
Figure 11:
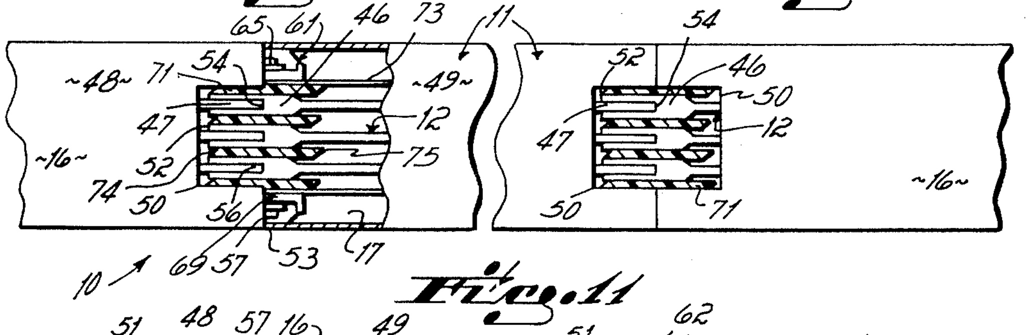
Figure 12:
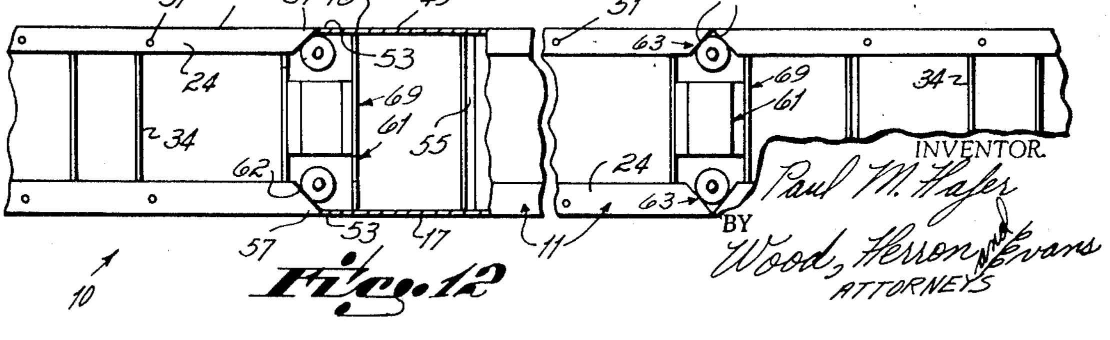
Figure 13:
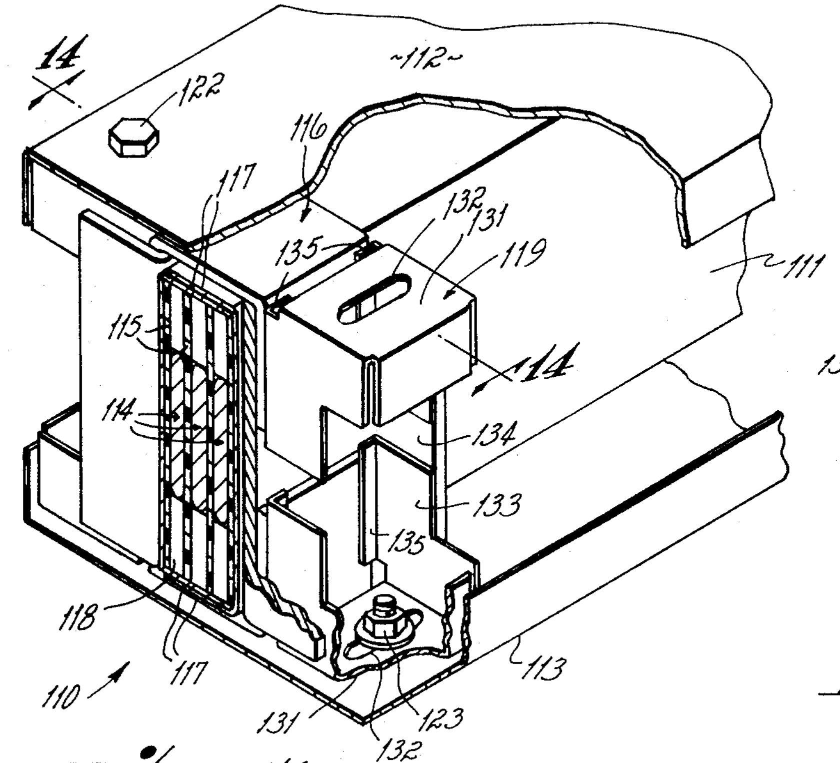
Figure 15:
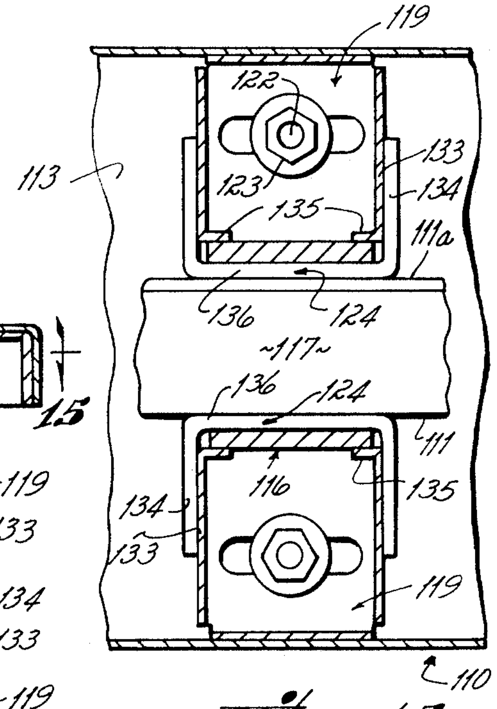
Figure 14:
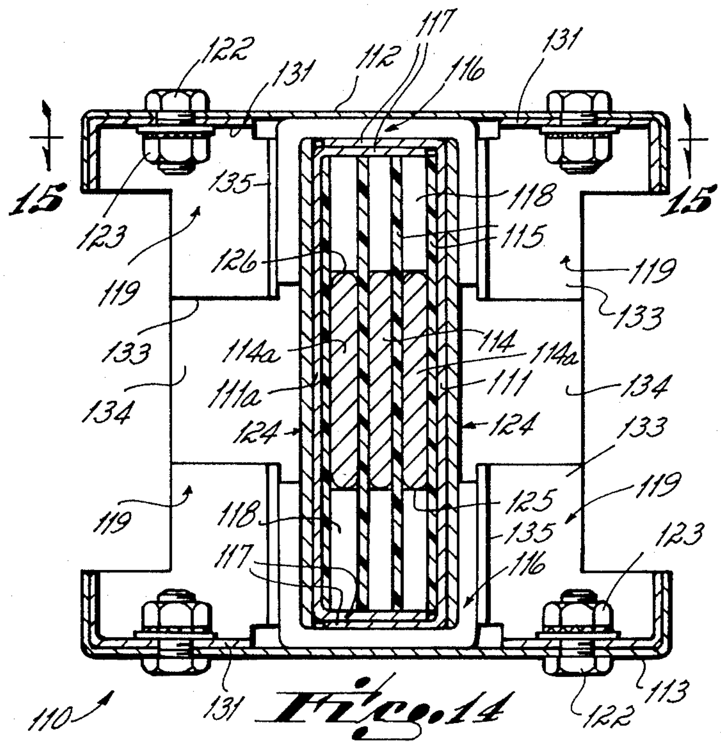

FIG. 9 is a view similar to FIG. 7 illustrating the bus bar coupler for the first bus duct fully recessed to a first position within the first bus duct and showing the bus bar ends of the second bus duct adjacent to and interleaved with the corresponding bus bar ends of the first bus duct, this first position permitting transverse movement of the second bus duct relative to the first bus duct when both ducts are positioned as shown in an end-to-end relationship for establishing an electrical joint therebetween;

FIG. 10 is a side view showing the first bus duct, the bus bar coupler for the first bus duct, and the second bus duct as shown in FIG. 9;

FIG. 11 is a view similar to FIG. 9 illustrating the bus bar coupler extended from the first duct's housing to a second or clamping position which permits the adjacent, corresponding bus bar ends of the second duct and the first duct to be clamped together in pairs by the coupler to establish a pressure type electrical joint between ducts;

FIG. 12 is a side view showing the joint clamping position as illustrated in FIG. 11;

FIG. 13 is a view similar to FIG. 2, but with the housing's top and bottom in place, of a second bus duct embodiment formed in accordance with the principles of this invention;

FIG. 14 is a cross-sectional view of a completely assembled bus duct taken along the same lines as lines 14—14 of FIG. 13;

FIG. 15 is a cross-sectional view taken along lines 15—15 of FIG. 14; and

Figure 16:
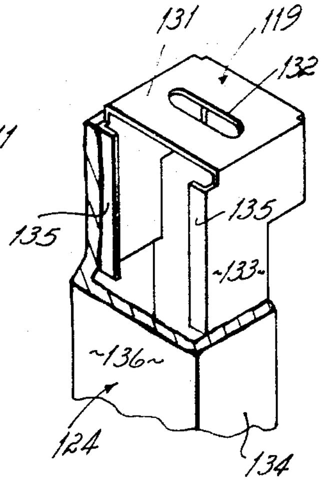

FIG. 16 is a partially broken away, detailed perspective view of the top portion of a heavy duty channel of that type positioned against the duct's sidewalls and spaced along the length thereof.

FIRST EMBODIMENT

Bus Duct Structure

Figures 3, 4:
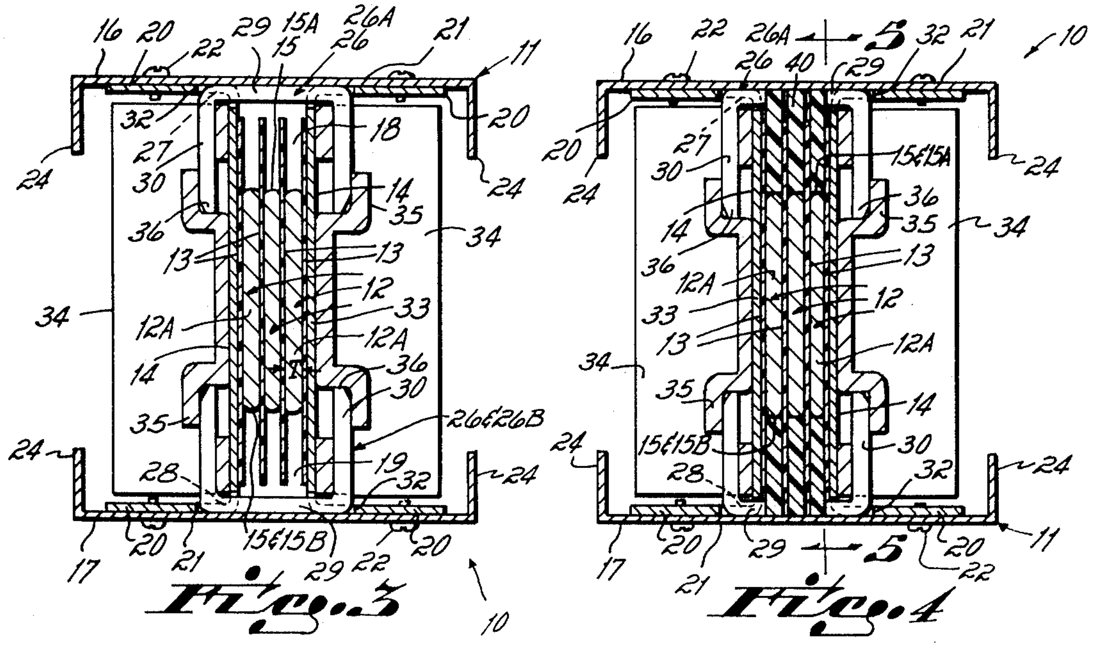
FIG. 3 is a cross-sectional view taken along lines 3—3 of FIG. 1.
FIG. 4 is cross-sectional view taken along lines 4—4 of FIG. 1.

One embodiment of the bust duct 10 formed in accordance with the principles of this invention is comprised of a housing 11 and a group of separate, elongated, flat bus bars 12 positioned in side-by-side relation, see FIGS. 3 and 4, within the housing. Because all of the bus bars 12 are of substantially the same external dimensions, the bus bars can be positioned in a group having opposite edges 15 in substantially common planes to form a rectangular cross section. A series of separate, flat, elongated insulator sheets 13 are positioned between adjacent bus bars 12, and between each of the housing's sidewalls 14 and the outermost bus bars 12*a* of the group, to insulate the bus bars one from the other and from the housing's sides. The height H of the housing's sidewalls 14 is substantially greater than the width W of the bus bars 12, the width of each bus bar being equal to the width of all other bus bars, see FIGS. 3–5. Each of the insulator sheets 13 is of a width W substantially greater than the width W of the bus bars, and each insulator sheet's width dimension is preferably on the order of the height H dimension of the housing's sides. The insulator sheets 13 are fabricated of an insulating composition that allows a thin sheet to be used so that the bus bars are spaced a distance one from the other that is less than the thickness T of a single bus bar. Thus, the bus bars 12 and the sidewalls 14 of the housing 11 are provided in electrically insulated, close thermal contact one with the other, see FIGS. 3 and 4.

As mentioned, the bus bars 12 are aligned flatwise in side-by-side relation and are aligned parallel with the housing's sidewalls 14. The bus bars 12 are centered relative to the housing's sidewalls 14, that is, the bus bars are spaced equally from the housing's top 16 and bottom 17, so that an airgap 18 is provided above the top edges 15*a* of the bus bars and an airgap 19 is provided below the bottom edges 15*b* of the bus bars. Thus, the insulator sheets 13 extend a substantial distance into the airgaps 18, 19 between top 15*a* of the bus bar group and the housing's top 16 and bottom 15*b* of the bus bar group and the housing's bottom 17. Such width W′ dimensions of the insulator sheets 13 act to prevent electrical creepage between adjacent bus bars 12 and between the outermost bus bars 12*a* and the housing's sides 14. The extent to which the insulator sheets 13 must extend above and below the top 15*a*, respectively, of the bus bar 12 group to prevent electrical creepage during use is dependent on the voltage at which the bus duct is designed to operate. That is, the higher the operating voltage of the bus duct the farther the insulator sheets 13 must extend above and below the top 15*a* and bottom 15*b*, respectively, of the bus bar group. However, if desired the distance differential between W and w′ may be set at a standard value sufficient to satisfy the requirement of the bus duct at maximum operating voltage values.

The sidewalls 14 of the housing 11 are comprised of channel sections positioned to face away from one another, and the housing's top 16 and bottom 17 are comprised of channel sections positioned to face toward one another. It will be noted that the flanges 20 of the side channels 14 are directly fixed to the center sections 21 of the top 16 and bottom 17 channels by metal screws 22 passing through the center sections 21 of the top and bottom sections into tapped holes 23 provided in the flanges 20 of the side channels to maintain the housing's sidewalls and top and bottom walls in elongated, housinglike configuration. However, the sidewall 14-insulator sheet 13-busbar 12 "sandwich" is maintained in functional assembly primarily by U-shaped clips 26 as will be subsequently described in detail.

At least two clips 26 (10 clips being employed in the duct structure shown in FIG. 1) are positioned to span the housing's sidewalls 14 at separate positions longitudinally spaced from one another along the top edges 27 of the sidewalls, the spanning portion 29 of each the clips being substantially spaced above top edges 15*a* of the bus bars 12 in substantially the same plane as the housing's top 16, see FIGS. 2–4. Likewise, at least two clips 26 (10 clips being employed in the duct structure shown in FIG. 1) are positioned to span the housing's sidewalls 14 at separate positions longitudinally spaced from one another along the bottom edges 28 of the sidewalls, the spanning portion 29 of each of these clips being substantially spaced below bottom edges 15*b* of the bus bars 12 in substantially the same plane as the housing's bottom 17. The clips 26 are provided to restrain mechanically the bus bar 12 group, the insulator sheets 13, and the sidewalls 14 in compact, assembled, side-by-side relation, see FIGS. 2–4. That is, clips 26 hold the bus bars 12, insulator sheets 13, and sidewalls 14 in functional assembly by squeezing the sidewalls toward one another, thereby acting to maintain the busbar-insulator sheet-sidewall combination or "sandwich" in the desired spatial and operational configuration relative one to the other.

The clips 26 are substantially U-shaped in configuration and, as mentioned, are adapted to fit over the top edges 27 and bottom edges 28 of the sidewalls 14, see FIGS. 2–4. When in locking or clamping position after assembly of the bus duct, legs 30 of each clip 26 are positioned on the outside of the sidewalls 14 and the clip's spanning portion 29 spans the sidewalls. The clips 26 are preferably positioned in pairs longitudinally along the bus bar duct, preferably each pair comprising a top clip 26*a* and a bottom clip 26*b* and being disposed in a plane substantially transverse to the axis 31 of the bus bar duct.

The legs 30 of the clips 26 cooperate with the flat center sections 33 of the channel-shaped sidewalls 14 by passing through elongated notches or openings 32 at the corners 27, 28 of the side walls' flanges 20 and center section 33, note particularly FIG. 2. This provides stop means in the form of a continuous structure surrounding each of the openings 32 associated with each of the clips 26; this structure prevents longitudinal movement of each clip relative to the axis 31 of the bus duct after the clip has been assembled with the sidewalls 14, insulator sheets 13 and bus bars 12. Hence, the bus duct of this invention contemplates a group of bus bars 12 and a plurality of insulator sheets 13 that are merely placed in juxtaposition one to the other between the sidewalls 14 of the bus bar housing 11, the busbar-insulator sheet-sidewall "sandwich" comprising an assembly only after clips 26 have been assembled therewith. The bus bars 12 and insulator sheets 13 are not preassembled in a one-piece unit in the sense that the bus bars and insulation means are not bonded or taped together into a one-piece assembly.

The housing 11 of the bus duct is additionally provided with a plurality of reinforcement members in the form of heavy duty channels 34 positioned against each of the sidewalls 14 for reinforcing the housing configuration during periods of high stress caused, for example, by short circuits in the power system. Further, such channels 34 serve as heat fins to aid in the dissipation of heat from the bus bar group generated during use of the duct. Each reinforcement member 34 further forms a parts of the complete force frame surrounding the bus bars 12 and insulator sheets 13. The force frame for holding the bus bars 12 and insulator sheets 13 in assembled relation thus includes clips 26, sidewalls 14 and channels 34.

Each of the reinforcement members 34 is positioned substantially transverse to the axis 31 of the bus duct against the housing's sidewalls 14, see FIG. 1. A heavy duty channel 34 is positioned to cooperate with each pair of the U-shaped clips 26 on each side 14 of the bus duct's housing 11. As shown particularly in FIGS. 2–4, the width of the spanning portion or base 29 of each U-shaped clip 26 is sufficient to permit the legs 30 of that clip to embrace the two heavy duty channels 34 and the housing's sidewalls 14, as well as the group of bus bars 12 and insulator sheets 13, associated with it. A finger 35 is punched out of the center section of each heavy duty channel 34 to receive the tip 36 of each U-shaped clip's leg 30 to prevent the legs of the clip from flaring outwardly in times of high short circuit stress. Each heavy duty channel 34 provides two fingers 35, one for the top clip 26*a* and one for the bottom clip 26*b* with which it is associated. Generally speaking, the distance between heavy duty channels 34 and pairs of clips 26 along the axial length of the bus bar duct is primarily dependent on the short circuit withstand desired for the final bus duct structure. That is, the lower the short circuit withstand design of the bus duct, the farther the distance between reinforcement members 34, may be in the final bus bar duct's structure.

The combination of U-shaped clips 26, the fingers 35 of the rigid channels 34, the rigid channels themselves, and the housing's sidewalls 14 provide a series of force frames longitudinally spaced along the bus duct's axis which cooperate to make the bus duct housing 11 as rigid as possible to preclude expansion of the housing during short circuits in the electrical system. Further, such a structural combination is effective in the dissipation of heat from the group of bus bars to the atmosphere. By such a unique structural assembly the requirement for wrapping the group of bus bars into an assembly of bus bars and, thereafter, bonding a sidewall to each side to that bus bar assembly, has been eliminated. Further, no welding is required during assembly of the bus duct of this invention. Thus, the bus duct of this invention is fabricated of simple parts which are easy to form and easy to assemble into a final structural assembly.

Figure 5:
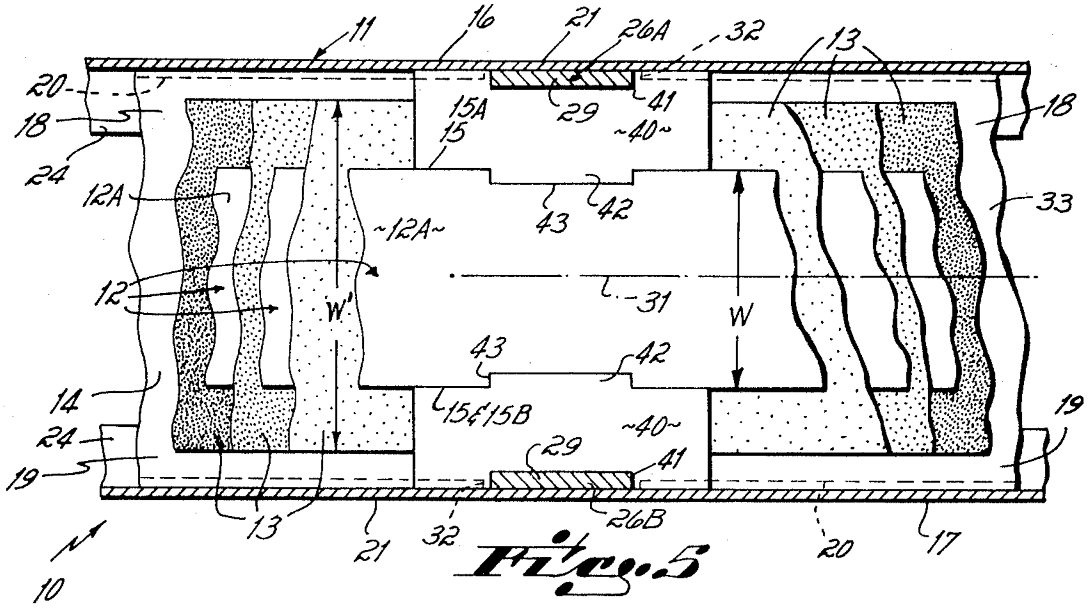
FIG. 5 is a cross-sectional view taken along lines 5—5 of FIG. 4.
Figure 6:
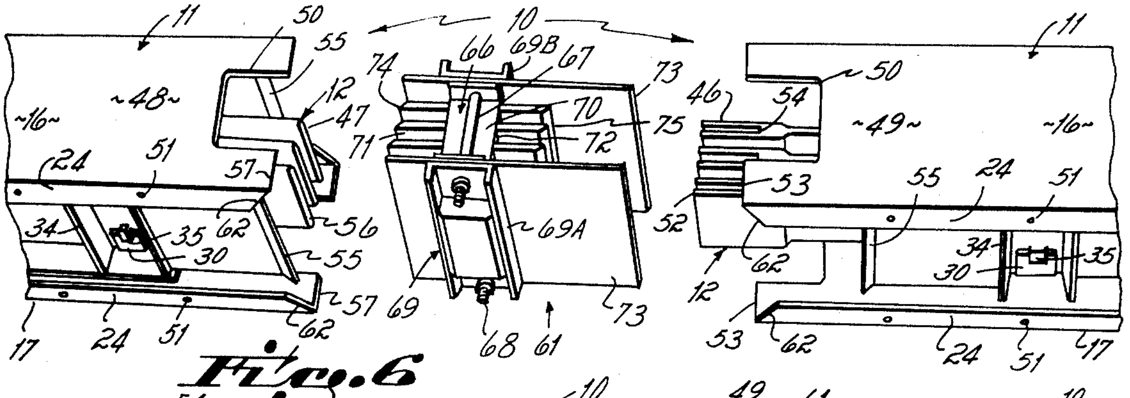
FIG. 6 is a perspective view illustrating a bus bar coupler intermediate the lead end and the trailing end, respectively of a first bus duct and a second bus duct both formed in accordance with the principles of this invention.

At least one spacer block 40 for each bus bar 12 is positioned between the top 15*a* of the bus bar 12 group and the housing's top 16 in the top airgap 18 in between the ends of the bus duct, and at least one spacer block for each bus bar is positioned between the bottom 15*b* of the bus bar group and the housing's bottom 17 in the bottom airgap 19 in between the ends of the bus duct, see FIGS. 2 and 5. These blocks 40 cooperate, particularly during assembly of the bus duct, to maintain the bus bars 12 in a centered position relative to the top and bottom walls 16, 17 inside the housing 11, that is relative to the axis 31 of the bus duct, see FIG. 5. Preferably, a set of spacer blocks 40 (one for each bus bar 12) is positioned at each end of the bus duct to provide a four-point suspension, so to speak, for the group of bus bars 12 within the bus duct housing 11. That is, a set of spacer blocks 40 is provided at each end of the bus duct in between the housing's top 16 and the top 15*a* of the bus bar 12 group, and a set of spacer blocks is provided at each end of the bus duct in between the housing's bottom 17 and the bottom 15*b* of the bus bar group.

The spacer blocks 40 are configured to cooperate with the U-shaped clips 26, see FIGS. 2, 4 and 5, to maintain the blocks between the respective clips and the bus bar group, that is, to prevent the blocks from sliding axially withing the housing 11, no matter what the installed orientation of the bus duct. To achieve such cooperation, each spacer block 40 is provided with a recess 41 sized to cooperate with the clip 26, see particularly FIG. 5. Further, it is preferred that the spacer blocks 40 also be provided with a protuberance 42 to cooperate with notches 43 in the top 15*a* and bottom 15*b* edges of their respective bus bars 12 adjacent that point where each spacer block is positioned so that the protuberances can be received within the recesses formed in the edges of the bus bars. Because the clips 26 are prevented from longitudinal movement relative to the bus duct's axis 31 by virtue of their being received through elongated openings 32 in the channel-shaped sides 14, and by virtue of the spacer blocks' engagement with the clips 26, the cooperation of the spacer blocks' protuberances 42 and the related notches 43 in the respective bus bars 12 prevent the bus bars from sliding longitudinally relative to the axis 31 of the housing even when the bus bar duct is vertically suspended.

At one end of each bus duct the bus bar ends are provided in bifurcated or fork 46 configuration and at the other end the bus bar ends are provided in stab 47 configuration. The stab ends 47 of a second bus duct 48 are received or interleaved with the fork ends 46 of a first bus duct 49 when those two bus ducts are brought together in end-to-end or abutting relation for purposes of creating an electrical joint therebetween, see FIGS. 6–12. Thus, an extended length bus bar run can be created of successive bus ducts by mating the fork and stab ends of successive bus ducts.

The ends of the housing's top 16 and bottom 17 have notches 50 cut therein for permitting the mated or interleaved bus bar ends to be observed when the bus ducts are joined in end-to-end or abutting relation. Further, these notches 50 are sized such that a single bus duct out of a chain or extended length bus bar run can be removed from that run without moving those bus ducts on either end of that one to be removed, see FIGS. 9 and 11. That is, the notches 50 are sized to permit the fork ends 46 of the bus bars of a first bus duct 49 to be disengaged from interleaved engagement with the stab ends 47 of a second bus duct 48 by moving the first bus duct transversely to the axis of the first bus duct without moving the second bus duct itself when the bus ducts are in end-to-end or abutting relation. Tapped holes 51 are provided adjacent the periphery of the notches 50 (such as on the flanges 24 of the top 16 and bottom 17 channels) so that channel like covers, not shown, can be attached between the successive bus ducts 48, 49 to close the openings created by the notches after the successive bus ducts have been mated. By removing the channel like cover, not shown, the electrical joint between successive ducts is easily made visible so that it can be observed for maintenance purposes.

The housing's sides 14 of each bus duct adjacent that end of the duct having the fork ends 46 are recessed substantially behind the outermost tips 52 of the fork ends and substantially behind the leading edges 53 of the housing's top 16 and bottom 17, the leading edges being in the same vertical plane in which the base 54 of the fork ends reside, see FIGS. 7–11. Also, the housing's sides 14 are provided with outwardly flared ends 55 at the fork ends 46 of the bus duct and those ends 55 are recessed substantially behind the leading edges 53 of the housing's top 16 and bottom 17, see FIGS. 1 and 6–10. The housing's sides 14 of each bus duct adjacent that end of the duct having the stab ends 47 are recessed just slightly behind the tips 56 of the stab ends. The trailing edges 57 of the housing's top 16 and bottom 17 are in substantially the same vertical plane as the tips 56 of the bus bars' stab ends.

Hence, as the first bus duct 49 is advanced toward the second bus duct 48, the first duct's fork ends 46 engage the second duct's stab ends 47 to establish an interleaved relation one with the other, and the ducts are advanced one toward the other until the first duct housing's leading edges 53 abut the second duct housing's trailing edges 57 to completely seat or interleave the stab ends in the fork ends, see FIGS. 6–10. Thus, the bus ducts 48, 49 are established in end-to-end relation for creating an electrical joint therebetween when fork ends 46 and stab ends 47 of successive bus ducts are interleaved and one duct housing's leading edge 53 abuts another duct housing's trailing edge 57. When in the abutted position, and when a bus bar coupler 61 is in joint forming relation with the interleaved fork 46 and stab 47 ends of successive bus ducts, the tapered ends 62 of the housing's top and bottom side flanges 24 cooperate to form V-notches 63 which permit adjustment of the bus bar coupler, see FIGS. 6 and 12.

The bus duct structure may also be quickly and economically insulated to obtain a watertight construction simply by filling the airgaps 18, 19 above and below, respectively, the top 15*a* and bottom 15*b* surfaces of the bus bar group with a suitable insulating material, see FIG. 3. The insulating material may be extruded, troweled or otherwise introduced into the airgaps 18, 19 between insulator plates 13 after the major portion of the bus duct has been assembled but before the housing's top 16 and bottom 17 are mounted in place. A typical insulating material found useful in a thixotropic, semiflexible, two part, epoxy resin system sold under the trademark SCOTCHEAST Resin No. 10 by Minnesota Mining and Manufacturing, Inc., Minneapolis, Minnesota. Such an insulated structure provides a totally insulated bus bar construction without altering the heat conductivity of the bus duct 10 so that heat generated at high amperage loads still is efficiently distributed to the atmosphere through the bus duct structure.

Bus bar Coupler Structure & Operation

A bus bar coupler particularly useful in electrically joining two successive bus ducts of this invention is particularly described in my copending application, U.S. Ser. No. 834,223, filed June 11, 1969. The bus bar coupler 61 includes a force frame 66 for permitting pressure to be exerted on the pairs of interleaved bus bar ends 46, 47 to create an electrical joint between successive bus ducts. The force frame 66 is comprised of a top bolt 67, a bottom bolt 68 and side pressure members in the form of rigid heavy duty channels 69. The bolts 67, 68 interconnect the pressure members 69 to form the force frame 66, the bolts being threaded to side member 69*a* but not to side member 69 *b*. Hex heads 65 on the bolts 67, 68 facilitate turning of the bolts by a suitable wrench to vary the dimensions of and, hence, the pressure exerted by, the force frame 66 when it is positioned relative to the interleaved bus bar end pairs 46, 47 of corresponding bus bars as illustrated in FIGS. 11 and 12.

Each of the top 67 and bottom 68 bolts carry a positioning rack 70, the bottom and sides of which are covered with an insulating material to provide complete electrical insulation for the bus bar ends 46, 47 from the top and bottom bolts when the coupler is in electrical joint forming relation with the interleaved ends of successive bus bar ducts. The force frame 66 is also provided with spacer plates 71 that are also made of an insulating material. The spacer plates 71 are provided with notches 72 in both the top and bottom edges that are sized to fit the positioning racks 70 carried by the bolts. The spacer plates 71 are thereby engaged with the force frame 66 so that they cannot move axially relative to the axis 31 of the bus duct when the coupler 61 is in operating position but enough play is provided so that the plates can move transverse to that axis as the electrical joint is being formed.

The coupler 61 further includes a guide plate 73 positioned between the outermost spacer plate and the pressure member 69 on each side of the force frame 66. It will be noted that the guide plates 73 extend to a point substantially flush with the leading edges 74 of the spacer plates 71 on one side, see FIG. 6. However, on the other side the guide plates 73 extend a distance substantially beyond the trailing edges 75 of the spacer plates 71.

In operation, with the bus duct of this invention the bus bar coupler 61 is initially recessed or telescoped into housing 11 of the first duct 49 to a first position which permits transverse movement of the successive or second bus duct 48 when both bus ducts are positioned in end-to-end relation for establishing an electrical joint therebetween, see FIGS. 6–10. As is particularly illustrated in FIGS. 7–10, when the bus bar coupler is recessed into first bus duct's housing the guide plates 73, spacer plates 71 and force frame 66 are all recessed into that housing to a point which permits the abutting or successive bus duct to be dropped out of interleaved engagement with the fork ends 46 of the first bus duct without engaging or contacting the bus bar coupler 61 as it drops out. The dimensions of the notch 50 in the top 16 and bottom 17 of the second bus duct 48 permit the first duct's fork ends 46 to pass through the top and/or bottom of the second bus duct without engaging it.

After the bus bar coupler 61 has been telescoped into the first bus duct 49 and after the second bus duct 48 has been positioned in end-to-end relation with the first bus duct whereat the stab ends 47 of the second duct are interleaved with the fork ends 46 of the first duct, the coupler is extended or telescoped out of the first duct's housing toward the second duct's housing to a second position whereat the coupler can clamp the adjacent interleaved bus bar ends together in pairs to establish a pressure-type electrical joint, see FIGS. 9–12. When the interleaved bus bar pairs 46, 47 are surrounded by the coupler's force frame 66 at this second position the bolts 67, 68 of the force frame need merely be tightened with a suitable wrench to connect or clamp the interleaved bus bar pairs into the pressure-type electrical joints, which joints are separated one from the other by the spacer plates 71.

When the bus bar coupler 61 is in its second or extended position, see FIG. 12, the guide plates 73 of the coupler cooperate with the sidewalls 14 of the two bus ducts 48, 49 to provide a continuous sidewall from one housing to the other with no interruption or gap which would expose the bus bars 12 themselves to the environment. Once the bolts 67, 68 of the force frame 66 have been tightened to establish the pressure-type electrical joint, the covers, not shown, can be fastened on to the top 16 and bottom 17 of the two bus duct housings 11 by means of tapped holes 51 and bolts, not shown, to close the openings created by the notches 50, thereby providing a completely enclosed chamber housing for the bus bar joints.

SECOND EMBODIMENT

A second embodiment of bus duct 110 which incorporates the principles of this invention is illustrated in FIGS. 13–16. This embodiment of bus duct 110 is similar to that embodiment illustrated in FIGS. 1–12, except that it differs in the relation of sidewall 111 one to the other, and in the manner in which the top 112 and bottom 113 of the elongated housing are fixed in place relative to the rest of the structure.

Generally speaking, and in regard to the relation of sidewalls 14, 111 one to the other in each duct embodiment, the channel-shaped sidewalls 14 of bus duct 10 (first embodiment) face out or away from one another, see FIGS. 2–4. In bus duct 110 (second embodiment) the channel-shaped sidewalls 111 face toward one another such that they telescope one within the other, see FIGS. 13 and 14. This relationship of the sidewalls 111, in the second embodiment presents an advantage over the relationship of the sidewalls 14 in the first embodiment in that jigs are not required to line up bus bars 114 and insulation strips 115 prior to installing U-shaped clips 116 during assembly of the duct 110, i.e., the flanges 117 of one sidewall 111 (when that sidewall 11 is laid on a table with flanges 117 directed up) act to center strips 115 and cooperate with spacer blocks 118 to center bus bars 114; this makes initial assembly easier than with first embodiment duct 10. Further, and in regard to the manner in which the top 16, 112 and bottom 17, 113 of each embodiment's housing are fixed in place, in the duct 10 (first embodiment) the top 16 and bottom 17 covers are joined directly to the sidewall flanges 20 by screws 22. But in duct 110 (second embodiment), while the top 112 and bottom 113 covers remain interconnected with the sidewalls 111 they are directly attached to a series of brackets 119 by bolts 122 and nuts 123. These brackets 119 are welded to the vertical rigid support members 124 that are spaced along the length of the duct 110 flush against each sidewall 111. Support members 124 are held in operating relation with the rest of the assembly and the entire sidewall 111—insulator strip 115—bus bar 114 sandwich is held together in assembly by the U-shaped clips 116. Hence, in duct 110 (second embodiment) the top 112 and bottom 113 covers are directly connected to the sidewalls 111 through brackets 119 and members 124, and are spaced slightly from the sidewall flanges 117 (see FIG. 14), while in duct 10 (first embodiment) the top 16 and bottom 17 covers are directly connected to the sidewalls 14 through screws 22 and lie on sidewall flanges 20.

As shown in FIGS. 13 and 14, bus duct 110 (second embodiment) is similar to the duct 10 (first embodiment) in that it includes a housing and a group of separate, elongated flat bus bars 114 positioned in side-by-side relation within the housing. Because all the bus bars 114 are of substantially the same external dimensions, the bus bars 114 can be positioned in a group having opposite edges 125, 126 in a substantially common plane to form a rectangular cross section. A series of separate, flat, elongated insulator sheets 115 are positioned between adjacent bus bars 114, and between each of the housing's sidewalls 111 and the outermost bus bars 114*a* of the group, to insulate the bus bars one from the other and from the housing's sidewalls. The height of the housing's sidewalls 111 is substantially greater than the width of the bus bars 114, the width of each bus bar being equal to the width of all other bus bars, see FIG. 14. Each of the insulator sheets 115 is of a width substantially greater than the width of the bus bars, and each insulator sheet's width dimension is preferably on the order of the height dimension of the housing's sides, see FIG. 14. Thus, the bus bars 114 and the sidewalls 111 of the housing are provided with electrically insulated close thermal contact one with the other to aid in dissipation of heat during use of the duct 110.

As illustrated, the bus bars 114 are aligned flatwise in side-by-side relation and are lined parallel with the housing's sidewalls. The bus bars 114 are centered relative to the housing's sidewalls, 111, that is, the bus bars are spaced equally from the housing's top 112 and bottom 113, so that an airgap is provided above the top edges 126 of the bus bars and an airgap is provided below the bottom edges 125 of the bus bars. The insulator sheets 115 extend a substantial distance into the airgaps between the top of the bus bar group and the housing's top 112, and between the bottom of the bus bar group and the housing's bottom 113. Such width dimensions of the insulator sheets are determined in accordance with the principles described in connection with bus duct 10 (first embodiment) and for the same reasons.

It will be particularly noted that the sidewalls 111 of duct 110 housing are comprised of channel sections which face toward one another and are telescoped into one another when finally assembled. The housing's top 112 and bottom 113 are also channel sections, and these sections also face toward one another but are sufficiently spaced away one from the other that they do not in any sense telescope one within another when finally assembled. This relationship of the sidewalls 111 one to the other, while embracing the bus bar 114—insulator sheet 115 sandwich therebetween, has a particular advantage during assembly of the bus duct 110 over that structure described in connection with duct 10 (first embodiment) This advantage is that sidewall 111*a*, which has its flanges 117 received within flanges 117 of the other sidewall 111 after assembly, acts as a jig during assembly or layup of the bus bars and insulator sheets relative one to the other. The sidewall 111*a* is simply laid flat or horizontal on a table with the flanges 117 facing upward; the insulator sheets 115 and bus bars 114 are thereafter laid in place. Spacer blocks 118 are provided at each end of the bus duct 110 above and below the bus bars 114 as in the case of duct 10 (first embodiment). Thus, and when insulator sheets 115 are of a width substantially equal to the height of the sidewall 111*a*, the insulator sheets are centered as they are laid up in the sidewall channel. After each insulator sheet 115 is laid down a bus bar 114 is laid on to thereof, and that bus bar is centered relative to the flanges 117 of the sidewall by virtue of spacer blocks 118 at each end of the bus duct structure which are also put in place. After all bus bars 114, all insulator sheets 115, and all spacer blocks 118 have been positioned in the channel-shaped sidewall 111*a*, the opposite sidewall 111 is telescoped thereover. Thus, the flanges 117 of the sidewall 111*a* itself cooperate in the laying up or assembly of the bus duct to act as guides which maintain the insulator sheets 115 and bus bars 114 (with the spacer blocks 118) in centered relation relative to the sidewalls during assembly as will as after the assembled sandwich structure is stood on end, see FIG. 14.

The top 112 and bottom 113 of the duct 110 housing are indirectly fixed to the sidewalls 111 of the housing through brackets 119 that are mounted (e.g., welded) to heavy duty channels or rigid support members 124. The sidewall 111—insulator sheet 115—bus bar 114 "sandwich" is maintained in functional assembly primarily by U-shaped clips 116 as will be subsequently described in detail.

At least two clips 116 are positioned to span housing's sidewalls 111 at separate positions longitudinally spaced from one another along the top edges of the sidewalls, the spanning portion of each of the clips being substantially spaced above top edges 126 of the bus bars and in substantially the same plane as the housing's top 112, see FIGS. 13–14. Likewise at least two clips 116 are positioned to span the housing's sidewalls 111 at separate positions longitudinally space from one another along the bottom edges of the sidewalls, the spanning portion of each of these clips being substantially spaced below bottom edges 125 of the bus bars and in substantially the same plane as the housing's bottom. The clips 116 are provided to restrain mechanically the bus bar 114 group, the insulator sheets, 115, and the sidewalls 111 in compact, assembled, side-by-side relation, see FIGS. 13 and 14. That is, clips 116 hold the bus bars, 114 insulator sheets 115, and sidewalls 111 in functional assembly by squeezing the sidewalls toward one another, thereby acting to maintain the bus bar insulator sheet-sidewall combination or "sandwich" in the desired spatial and operational configuration relative one to the other. The function of the clips 116 in duct 110 (second embodiment) is substantially the same as the function of the clips 26 in duct 10 (first embodiment). The clips 116 are substantially U-shaped in configuration and, as mentioned, are adapted to fit over the top edges and bottom edges of the sidewalls, 111, see FIGS. 13 and 14.

When in locking or clamping position after assembly of the bus duct 110, the legs of each clip 116 are positioned on the outside of the sidewalls 111 and the clip's spanning portion spans the sidewalls. The clips 116 are preferably positioned in pairs longitudinally along the bus bar duct 110, each pair comprising a top clip and a bottom clip with the pair being disposed in a plane substantially transverse to the axis of the bus duct.

As mentioned, the housing of the bus duct is additionally provided with a plurality of reinforcement members 124 in the form of heavy-duty channels in a manner similar to support members 34 of duct 10 (first embodiment). The heavy-duty channels 124 are positioned against each of the sidewalls 111 for reinforcing the housing configuration during periods of high stress. Further, such channels 124 serve as heat fins to aid in the dissipation of heat from the bus bar 114 group generated during use of the duct 110. Each reinforcement member 124 further forms a part of a complete force frame surrounding the bus bars 114, insulator sheets 115 and sidewalls 111. The force frame for holding the bus bars 114 and insulator sheets 115 in assembled relation thus includes clips 116, sidewalls 111 and members 124.

Each of the reinforcement members 124 is positioned substantially transverse to the axis of the bus duct 110 against the housign's sidewalls 111, see FIGS. 13 and 14, and a heavy-duty channel is positioned to cooperate with each pair of the U-shaped clips 116 on each side of the bus duct's housing. As shown particularly in FIGS. 13 and 15, the width of the spanning portion or base of each U-shaped clip 116 is sufficient to permit the legs of that clip to embrace the two heavy-duty channels 124 positioned against the housing's sidewalls 111, as well as the group of bus bars 114 and insulator sheets 115 associated with it. As with duct 10 (first embodiment), generally speaking, the distance between heavy-duty channels 124 and pairs of clips 116 along the axial length of the bus duct 110 is primarily dependent on the short circuit withstand desired for the final bus duct structure.

A bracket 119, as illustrated in FIGS. 13, 15 and 16, is preferably welded to the upper end and to the lower end of each heavy-duty channel 124. Each bracket 119 is U-shaped in configuration (see FIG. 16) and includes a base portion 131 having an elongated slot 132 therein; the base 131 is integral with sidewall portions 133 that are welded to the inside of flanges 134 of member 124.

Each leg 133 of the bracket 119 has formed thereon a guide strip 135, see FIGS. 15 and 16. The guide strips 135 are thus fixed to the heavy-duty channels 124 since the brackets 119 are welded thereto. The guide strips 135 of each bracket 119 are positioned relative to the base 136 of each heavy-duty channel 124 before welding bracket 119 to channel 124 such that a gap is provided between the guide strips and the base of the heavy-duty channel after welding the two parts together. The legs of the U-shaped clip 116 are thus received in the slot so defined when the U-shaped clip is assembled with the bus bar 114—insulator sheet 115—sidewall 111 "sandwich." This structure prevents the legs of the clips from flaring outwardly in times of high short circuit stress and serves to reinforce the bus duct 110 assembly.

The elongated slot 132 on the top of each bracket 119 is positioned in the bracket so that bolts 122 which pass through suitable holes in the top 112 and bottom 113 of the housing may also pass therethrough. The head end of the bolt 122 is located on the top 112 or bottom 113 of the housing, see FIG. 13, and the other end of the bolt receives a nut 123 on the underside thereof to complete connection of the top and bottom covers to the brackets 119. Thus, the top 112 and bottom 113 of the bus duct's housing is indirectly secured to the sidewalls 111 of the housing through the bracket 119-reinforcing channel 124 structure.

The ends (not shown) of the bus duct 110 housing, and the ends (not shown) of the bus bars 114 themselves, may be formed as described in connection with duct 10 (first embodiment) herein. Further, such a bus duct 110 (second embodiment) may be employed with a bus bar coupler system as described in connection with duct 10 (first embodiment).

Having completely described the preferred embodiment of my invention, what I desire to claim and protect by Letters Patent is:

1. A bus duct comprising a group of elongated flat bus bars positioned in side-by-side relation, said bus bars only being separated one from the other by insulation means, and an elongated housing substantially enclosing said bus bars, said housing including (a) a pair of elongated sidewalls of height substantially greater than the width of said bus bars, one of said sidewalls being positioned on each side of said bus bar group in side-by-side relation with said group and only being separated therefrom by further insulation means, (b) at least two clips spanning said sidewalls at separate positions longitudinally spaced from one another along the top edges of said sidewalls, the spanning portion of each of said clips being substantially spaced above said bus bar group, (c) at least two clips spanning said sidewalls at separate positions longitudinally spaced from one another along the bottom edges of said sidewalls, the spanning portion of each of said clips being substantially spaced below said bus bar group, all of said clips serving to restrain mechanically said bus bar group and said sidewalls in compact, sandwichlike, side-by-side relation, and (d) an elongated top and an elongated bottom interconnected between the tops and bottoms, respectively, of said sidewalls and substantially spaced from said bus bar group, said sidewalls said top and said bottom forming said elongated housing for said bus bar group.

2. A bus duct as set forth in claim 1 wherein said top and bottom clips are positioned in pairs, each pair comprising a top clip and a bottom clip and being in a plane substantially transverse to the axis of said bus bar duct.

3. A bus duct as set forth in claim 1 wherein said clips are substantially U-shaped and fitted over the top edges and bottom edges of said sidewalls, the legs of said clips being positioned on the outside of said sidewalls.

4. A bus duct as set forth in claim 3 including stop means cooperating with each of said clips to prevent longitudinal movement of said clips relative to the axis of said bus bar duct.

5. A bus duct as set forth in claim 4 further including at least one spacer block positioned between said top and said bus bar group intermediate the ends of said bus bar duct and at least one spacer block positioned between said bottom and said bus bar group intermediate the ends of said bus duct said blocks cooperating to maintain said bus bar group in centered position relative to said sidewalls inside said housing.

6. A bus duct as set forth in claim 5 wherein each of said spacer blocks has a recess cooperating with said clip to maintain said block between said clip and said bus bar group.

7 A bus duct as set forth in claim 6 wherein each of said bus bars have either a protuberance or a recess on the edge of said bus bar, and wherein said spacer blocks have a complimentary recess or a protuberance receiving that configuration formed on each of said bus bars, said stop means, clip, spacer block and bus bars thereby cooperating to prevent said bus bars from sliding longitudinally relative to the axis of said housing.

8. A bus duct as set forth in claim 3 wherein said housing further includes a plurality of rigid support members positioned against each of said sidewalls for reinforcing said housing configuration, each of said members being positioned substantially transverse to the axis of said bus bar duct.

9. A bus duct as set forth in claim 8 wherein each of said support members is restrained in position against said sidewall by one of said top clips and one of said bottom clips.

10. A bus duct as set forth in claim 1 wherein said insulation means comprises a series of separated, flat, elongated insulator sheets positioned between bus bars and positioned between each of said sidewalls and the outermost bus bar of said bus bar group, each of said sheets being of a width substantially greater than the width of said bus bars.

11. A bus duct as set forth in claim 1 wherein said sidewalls are comprised of channel sections positioned to face away form one another, and wherein said top and bottom are comprised of channel sections positioned to face toward one another, the flanges of said side channels being fixed to the center sections of said top and bottom channels.

12. A bus duct comprising a group of elongated flat bus bars positioned in side-by-side relation, said bus bars only being separated one from the other by insulation means, and an elongated housing substantially enclosing said bus bars, said housing including (a) a pair of elongated sidewalls of a height substantially greater than the width of said bus bars, one of said sidewalls being positioned on each side of said bus bar group in side-by-side relation with said group and only being separated therefrom by further insulation means, (b) at least two clips spanning said sidewalls at separate positions longitudinally spaced from one another along the top edges of said sidewalls, the spanning portion of each of said clips being spaced above said bus bar group, and (c) at least two clips spanning said sidewalls at separate positions longitudinally spaced from one another along the bottom edges of said sidewalls, the spanning portion of each of each of said clips being spaced below said bus bar group, all of said clips serving to aid in restraining said bus bar group and said sidewalls in compact, side-by-side relation.

13. A bus duct as set forth in claim 12 including an elongated top and an elongated bottom fixed in position relative to the top edges and bottom edges, respectively, of said sidewalls and substantially spaced from said bus bar group, said sidewalls, said top and said bottom forming said elongated housing for said bus bar group.

14 A bus duct as set forth in claim 13 wherein said clips are substantially U-shaped and fitted over the top edges and bottom edges of said sidewalls, the legs of said clips being positioned on the outside of said sidewalls.

15. A bus duct as set forth in claim 14 further comprising at least one spacer block positioned between said top and said bus bar group intermediate the ends of said bus bar duct and at least one spacer block positioned between said bottom and said bus bar group intermediate the ends of said but duct, said blocks cooperating to maintain said bus bar group in a centered positioned relative to said sidewalls inside said housing.

16. A bus duct as set forth in claim 15 wherein each of said spacer blocks has a recess cooperating with said clip to maintain said block between said clip and said bus bar group.

17. A bus duct as set forth in claim 16 wherein each of said bus bars have either a protuberance or a recess on the edge of said bus bar, and wherein said spacer blocks have a complimentary recess or a protuberance receiving that configuration formed on each of said bus bars, said clip, spacer block and bus bars thereby cooperating to prevent said bus bars from sliding longitudinally relative to the axis of said housing.

18. A bus duct as set forth in claim 13 wherein said sidewalls are comprised of channel sections positioned to face away from one another, and wherein said top and bottom are comprised of channel sections positioned to face toward one another, the flanges of said side channels being fixed to the center sections of said top and bottom channels.

19. A bus duct as set forth in claim 14 wherein said sidewalls are comprised of channel section positioned to face toward one another such that said sidewall channel sections are telescoped within one another when assembled, and including a bracket fixed to the top and bottom of each rigid support member, said elongated top and said elongated bottom of said elongated housing being fixed to said bracket.

20. A bus duct as set forth in claim 19 wherein said clips are substantially U-shaped and fitted over the top and bottom edges of said sidewalls, wherein said brackets are fixed to said support member such as to define a slot at the top and bottom of each support member, and wherein the legs of said U-shaped clips are positioned in said slots.

21. A bus duct as set forth in claim 12 wherein said top and bottom clips are positioned in pairs, each pair comprising a top clip and a bottom clip and being in a plane substantially transverse to the axis of said bus bar duct.

22. A bus duct as set forth in claim 12 wherein said housing further includes a plurality of rigid support members positioned against each of said sidewalls for reinforcing said housing configuration, each of said members being positioned substantially transverse to the axis of said bus bar duct, said support members being restrained in position against said sidewall by one of said top clips and one of said bottom clips.

23. A bus duct as set forth in claim 12 wherein said insulation means comprises a series of separate, flat, elongated insulator sheets positioned between bus bars and positioned between each of said sidewalls and the outermost bus bar of said bus bar group, each of said sheets being of a width substantially greater than the width of said bus bars.

24. A bus duct as set forth in claim 12 wherein said sidewalls are comprised of channel sections positioned to face toward one another such that said sidewall channel sections are telescoped within one another when assembled.

* * * * *

UNITED STATES PATENT OFFICE

CERTIFICATE OF CORRECTION

Patent No. 3,636,237 Dated January 18, 1972

Inventor(s) Paul M. Hafer

It is certified that error appears in the above-identified patent and that said Letters Patent are hereby corrected as shown below:

In the Claims:

(1) Column 11 - Line 58, after "of", second occurrence, insert -- a --.

(5) Column 12 - Line 22 after "in" insert ---a---

(10) Column 12 - Line 46 "separated" should be ---separate---.

(12) Column 12 - Line 75 after "of each" delete ---of each---

(12) Column 13 - Line 3 after "compact" insert ---sandwich-like---

(15) Column 13 - Line 20 "positioned" should be ---position---

Signed and sealed this 6th day of March 1973.

(SEAL)
Attest:

EDWARD M.FLETCHER,JR.
Attesting Officer

ROBERT GOTTSCHALK
Commissioner of Patents